United States Patent [19]

Söderberg et al.

[11] Patent Number: 4,982,504

[45] Date of Patent: Jan. 8, 1991

[54] METHOD FOR DETERMINING POSITIONAL ERRORS AND FOR COMPENSATING FOR SUCH ERRORS, AND APPARATUS FOR CARRYING OUT THE METHOD

[75] Inventors: Bo Söderberg, Köping; Bo Pettersson, Torshälla; Ulf Höcke, Eskilstuna; Ambjörn Naeve, Stockholm, all of Sweden

[73] Assignee: C.E. Johansson AB, Eskilstuna, Sweden

[21] Appl. No.: 311,950

[22] Filed: Feb. 17, 1989

[30] Foreign Application Priority Data

Feb. 18, 1988 [SE] Sweden ............................... 8800566

[51] Int. Cl.$^5$ .......................... G01C 25/00; G10B 5/03
[52] U.S. Cl. .......................................... 33/502; 33/505; 33/503; 73/1 J; 364/571.01; 364/571.02
[58] Field of Search ........................ 33/502, 503–505, 33/626, 556; 73/1 J; 364/571.01, 571.02

[56] References Cited

U.S. PATENT DOCUMENTS

| | | | |
|---|---|---|---|
| 3,795,054 | 3/1974 | Kinney | 33/502 |
| 4,437,151 | 3/1984 | Hurt et al. | 33/503 |
| 4,492,036 | 1/1985 | Beckwith, Jr. | 33/503 |
| 4,523,450 | 6/1985 | Herzog | 33/502 |
| 4,549,359 | 10/1985 | Hense et al. | 33/1 M |
| 4,777,818 | 10/1988 | McMurtry | 33/503 |
| 4,819,195 | 4/1989 | Bell et al. | 33/503 |
| 4,939,678 | 7/1990 | Beckwith, Jr. | 33/505 |

*Primary Examiner*—William A. Cuchlinski, Jr.
*Assistant Examiner*—C. W. Fulton
*Attorney, Agent, or Firm*—Nies, Kurz, Bergert & Tamburro

[57] ABSTRACT

A method for determining and correcting positional errors or deviations which occur when measuring the position of a point in space, or when positioning to a point which has a specific position in space, where the position refers to a specific coordinate system, such as a rectangular coordinate system. The method comprises making a comparison between a multiple of measured values and at least one reference, and determining a correction on the basis of this comparison, wherewith a positionable member, such as a contact probe, a tool holder or corresponding device (1, 13) is moved to a given position in space during the measuring or positioning process. The method is particularly characterized in that the reference consists of a geometry of known kind, and in that the measured values are correlated to a geometry of known kind, this correlation being used to calculate corrections for the coordinate axes of the system. There is also an apparatus for carrying out the method.

22 Claims, 1 Drawing Sheet

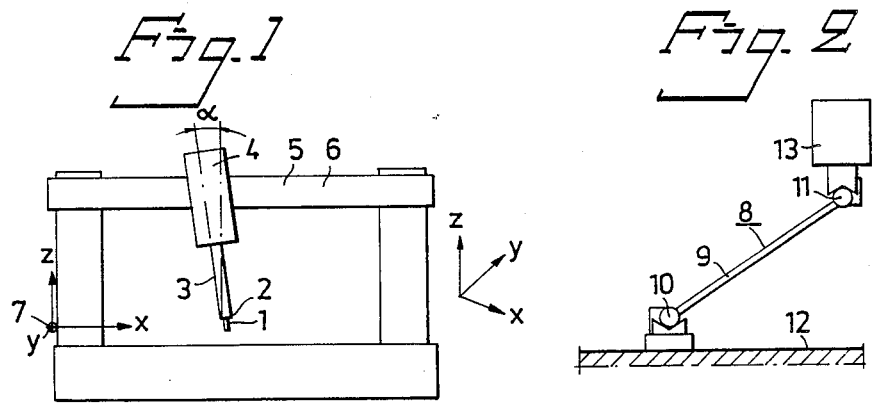
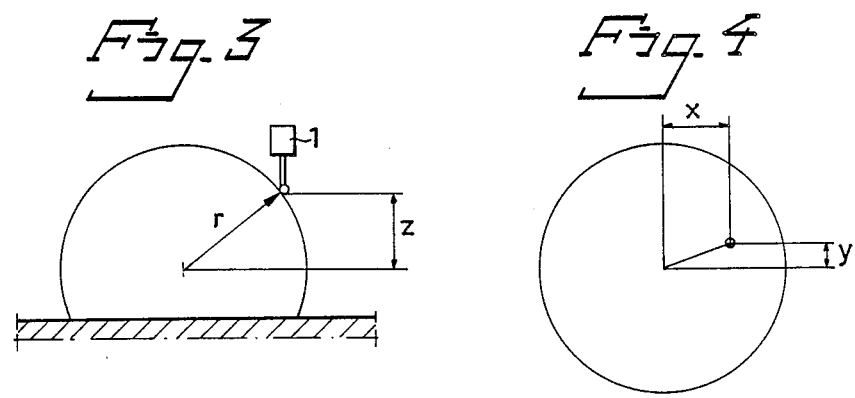
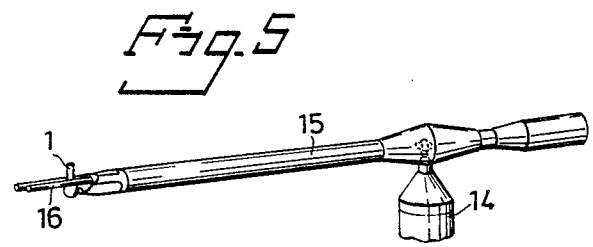
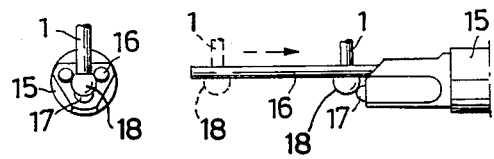

METHOD FOR DETERMINING POSITIONAL ERRORS AND FOR COMPENSATING FOR SUCH ERRORS, AND APPARATUS FOR CARRYING OUT THE METHOD

The present invention relates to a method for determining and for compensating for positional errors which occur when measuring the position of a point in space, or when positioning to a point which has a specific location or position in space, where said position refers to a specific coordinate system, such as a rectangular coordinate system, said method comprising comparing a plurality of measured values with at least one reference and determining a correction on the basis of the comparison.

The invention also relates to apparatus for carrying out the method.

When using technical auxiliary devices, such as production machines, measuring systems and like auxiliaries, it is often necessary to position a point in space, or to determine the position of a point in space, with great accuracy.

By "space" is meant here a three-dimensional position or location and the term can be said here to relate to the content of a volume, which normally, but not necessarily, is related to three coordinate axes which form angles with one another. Furthermore, the word error as used here is also meant to include deviation.

The position of a point in space can therefore be described either in respect of mutually perpendicular coordinates (x, y, z) in relation to a reference point (origo), or in respect of polar coordinates or some other transformation. The following description will be given with reference almost solely to systems with mutually perpendicular coordinates, although it will be understood that the invention can be applied in a readily understood manner with other types of coordinate systems, for instance systems where polar coordinates are used in one or more axes.

When determining or measuring the position of a point in space, or positioning to a given point in space, in addition to requiring a high degree of precision in the longitudinal direction or the coordinate axes it is also necessary for the various axes to be located at exactly 90° to one another, so that determination of said position is truly effected in a rectangular coordinate system. Deviations from 90° will be give rise to trignometrical errors in the coordinate readings or notations. In addition to purely angular errors, other types of errors can also occur, such as rotational errors in the longitudinal directions of the coordinate axes.

In principle, a so-called coordinate measuring machine, for instance, will comprise a measuring probe which can be brought to any desired position in space along three mutually perpendicular coordinates x, y, z. The position of the probe can be given in terms of the x, y, z coordinates with the aid of scales or graduation provided therealong. In the case of a system of this kind, an error in the angular setting of one of the axes can result in erroneous values from all three axes.

In practice, errors of the kind referred to occur in all three axes in three geometric planes for each axis, simultaneously. Consequently, in order to minimize error contributions for such errors, the angular positions of such coordinate axes relative to one another must be adjusted to a very high degree of accuracy. The work involved herewith is highly demanding and time consuming and consequently it is desirable to eliminate the need of adjusting the mutual position of the axes mechanically and instead to replace this mechanical procedure with some form of calibrating method.

Attempts have been made to achieve this, by measuring each individual error separately, e.g. angle errors and errors in the positions of the x-axis, the y-axis and the z-axis.

This measuring method will provide a number of correction factors which, with the aid of a suitably configured data program, can be used to correct the measuring values obtained. This method is essentially totally emperical and has the serious disadvantage of requiring the provision of qualified measuring equipment, in the form of angle references, laser measuring equipment or the like. Since such measurements are often carried out at the place of the machine user, this means that bulky, sensitive and expensive measuring equipment must be transported to and from the site in question.

Methods which utilize references are known to the art, in which known reference values are found for each separate measuring process and are compared with the measured values. In this case, an individual measuring process may consist of a multiple of measuring procedures, such as when measuring on spherical references for instance. In this instance, the reference is the centre of the sphere, the position of which centre is determined by taking a number of measurements from the surface of the reference sphere and then calculating the position of said centre in accordance with known mathematical methods.

Distinct from this known method, the present invention relates to a method which does not utilize the reference values of individual measurement values or in which said reference values are not known. Instead there is used a known geometrical relationship of the reference. When the measuring apparatus is totally free of all error, the collective multiple of measured value points determined on the reference will describe a geometric configuration precisely indentical to that of the reference. When errors or deviations occur in the mutual perpendicularity of one or more of the axes, this geometry will be distorted in a manner contingent on the size of the aforesaid error in respective coordinate axes. Information concerning the size of the error in respective axes can be obtained, by making a comparison with a known geometry or geometric configuration. Accordingly, the inventive method is characterized in that a comparison with a known geometry is made instead of comparing measured points with known control values; in that it is unnecessary during any part of the process to utilize comparison of individual measurement values or part quantities of measurement values for comparison with predetermined control values; and in that information relating to errors in all coordinate axes is obtained directly from the comparison made.

The present invention eliminates the problems associated with the known technique. For instance, it is not necessary to transport additional equipment for the purpose, since the measuring or positioning system intrinsic of the checked system is used. Only simple and relatively non-bulky reference objects need be transported. Since the measuring procedure is fully automatic, subsequent to a simple rigging process the inventive measuring method can also be carried out by unqualified personnel. The time taken to complete the measuring process is only a fraction of the time required to carry out the known parameter based measuring process.

The present invention thus relates to a method for determining and correcting positional errors occuring when measuring the position of a point in space, or when positioning to a point which has a defined position in space, where said position is referred to a specific coordinate system, such as a rectangular coordinate system, the method comprising making a comparison between a multiple of measured values and at least one reference, and determining a correction on the basis of said comparison, and in which method a positionable member, such as contact probe, a tool holder or like device is moved to a given position in space during the measuring or positioning process.

The method is particularly characterized in that said reference is a known geometric configuration or geometry, in that the measured values are correlated to a known geometry, and in that the correlation is utilized to calculate corrections for the coordinate axes of the system.

The invention also relates to apparatus for determining and correcting positional errors which occur when measuring the position of a point in space or when positioning to a point having a specific position in space, where said position refers to a specific coordinate system, such as a rectangular coordinate system, which apparatus includes means for moving a positioning device, such as a contact probe, a tool holder or the like, to a given position in space during said measuring or positioning process, and means for comparing a multiple of measured values with at least one reference and for determining a correction on the basis of the comparison.

The inventive apparatus is particularly characterized by the provision of position establishing devices for establishing positions disposed in accordance with a geometry of known kind which constitutes said reference; and by the provision of means for calculating corrections for the system coordinate axes on the basis of such a geometric correlation to said measured values.

The invention will now be described in more detail with reference to exemplifying embodiments thereof and with reference to the accompanying drawings, in which FIG. 1 illustrates schematically a coordinate measuring machine seen in the direction of the measuring axis of the y-coordinate;

FIG. 2 illustrates schematically a first embodiment of a position establishing device for use with the inventive apparatus;

FIG. 3 illustrates schematically a spherical surface generated with apparatus substantially in accordance with FIG. 2;

FIG. 4 is a view of the surface in FIG. 3 as seen from above in FIG. 3;

FIG. 5 illustrates schematically a second embodiment of a position establishing device for use with the inventive apparatus;

FIG. 6 is an enlarged side elevation schematic illustration of the left-hand part of the apparatus seen in FIG. 5 showing measurement against an end part of the apparatus; and FIG. 7 is an end view of FIG. 6 seen from the left-hand side of FIG. 6.

FIG. 1 illustrates schematically a coordinate measuring machine which includes a contact type measuring probe 1 which can be moved to a desired position and which is mounted at the free end 2 of the measuring axis 3 of the z-coordinate, said axis being carried by a housing 4 which is displaceably mounted on a rail 5 which forms the measuring axis 6 of the x-coordinate. The rail 5 can be displaced perpendicularly to the plane of the paper, to form a measuring axis 7 for the y-coordinate. The coordinate system is shown separately to the right in FIG. 1.

FIG. 1 shows an exaggerated obligueness α of the z-axis, which results in an error of measurement in both the x and the y directions.

The measuring probe can thus be displaced in space and is intended to be moved towards and into contact with a measurement object, the location or position of the contact point in terms of its coordinates being determined and registered.

In FIG. 2, the reference 8 identifies a position establishing device which is effective in producing positions commensurate with a known geometry or geometric configuration, which is intended to function as a reference. The position establishing device 8 consists of an arm 9 which by means of precision ball couplings 10, 11 is movably journalled at a fixed location on the table 12 of the machine or the like, and also at a fixed location or a fixed part 13 connected to the coordination system of the machine or the like, said fixed part in this case comprising a positionable member. Consequently the measuring machine or the like is restricted to taking or adopting only those coordinate positions which are permitted by the length of the arm 9, whereby the end of the arm that coacts with the positionable member will describe discrete position points (punctiform positions) generating a perfect spherical surface in space, as illustrated schematically in FIGS. 3 and 4. Thus, the geometry in this particular case can be expressed by the relationship:

$$r^2 = x^2 + y^2 + z^2$$

where r is the radius of the spherical surface and x, y and z are coordinates.

FIGS. 5 and 6 illustrate another embodiment of a position establishing device. The device is of an essentially known kind and includes a stand 14, in the form of a post, which is intended to be placed on a measuring machine table and which carries an arm 15. The arm is pivotally mounted with great precision and carries at one end a bifurcate part 16 which is intended to coact with, for instance, a measuring probe 1 equipped with a ball 18, as illustrated schematically in the Figures. The arm 15 is arranged to be moved by means of the probe and includes a contact device 17 against which the ball 18 or like device on said probe 1 is intended to be moved in order to detect a position. This position establishing device will also establish positions on a spherical surface and herewith a geometry of the earlier mentioned kind, and has the advantage that when moving between positions which are to be measured, the measuring probe or the like need not be moved along a spherical surface, but can be displaced, for instance, rectilinearly, said movement being terminated by bringing the measuring probe 1 into contact with the contact device 17 on the arm 15.

One single geometry or geometric configuration is sufficient for calculating and obtaining the correction values. In order to achieve greater precision in the foundation for correction, there are used position establishing devices for producing at least two mutually different geometrics or geometric configurations. In devices of this kind, illustrated schematically in FIGS. 2, 5 and 6, this means that several arms are used, said arms being of mutually different lengths so as to produce spherical surfaces of differing radii.

Apparatus in the form of, inter alia, computers of appropriate kinds are found, according to one embodiment, which are effective in registering a plurality of measured points disposed in accordance with a known geometry or known geometric configurations and in calculating corrections for respective axes with the aid of the correlation of the predetermined values to the measured values.

Such apparatus, computers, will preferably include a memory unit for the storage of calculated corrections.

In the case of measuring machines and the like there will preferably be provided a registration and calculation unit arranged to correct, preferably automatically, measuring values related to position based on calculated correction values.

In the case of apparatus where positioning to a given point is desired, there will preferably be provided a registering and calculating unit for correcting, preferably automatically, positioning control signal, this rectification process being effected on the basis of calculated correction values.

The inventive method and the modus operandi of the inventive apparatus will be understood in all essentials from the aforegoing.

When carrying out measurements with respect, preferably, to a multiple of positions disposed in accordance with said known geometry, such as the aforesaid spherical geometry or geometrics, and then through mathematical analysis comparing the geometry produced by the associated measured quantity of coordinate values $x'$, $y'$, $z'$, with a corresponding mathematical model, of a known kind, there is obtained a three-dimensional error matrix which will include at each separate point error contributions from all three coordinate axes, where the amount of coordinate values includes a plurality of different combinations of different x, y and z values in accordance with the predetermined three-dimensional relationship.

The requisite correction factors can be calculated with the aid of appropriate mathematical methods. The errors can thus be extracted and separated to the coordinate system references, e.g. the x, y and z coordinates, for each measuring point, by comparison with said geometry, in a calculation which incorporates a plurality of matrix equations. By storing the correction values in the memory of a computer, the correction data can be utilized for correcting automatically the measuring values or the like located both within and without the volume of the reference object, the position establishing devices.

A first step is that of compiling correction factors which relate to linear errors, such as angular errors, between the various coordinate axes. Non-linear errors will also occur, however, for instance as a result of crookedness or curvature in axis guides. These non-linear errors can also be calibrated out by, e.g., making a plurality of measurements where the reference object, the setting point of the position establishing devices, is moved between the different measuring processes.

It will be understood from the aforegoing that the present invention affords important advantages in comparison with known techniques. Correction factors can thus be compiled with the aid of the fundamental measuring and/or positioning system of the checked or controlled system, both easily and quickly. A relatively limited number of measurements are made and the calculations can be carried out in a relatively short period of time, in the present case by the computer equipment of the system itself.

The invention has been described in the aforegoing with reference to an exemplifying embodiment thereof. It will be understood, however, that other embodiments and minor modifications are conceivable within the scope of the inventive concept.

When said positions are disposed in accordance with a geometry of known kind or configuration, it will be evident that many other geometries other than spherical geometries are conceivable. Neither need the geometries be known explicitly, although knowledge of the type of geometry is necessary.

When two or more separate coordinate systems are to be used as parts of a larger, common system, it is necessary to coordinate accurately the ingoing part-systems. In this respect, the invention is applicable when desiring to learn of the orientation of the various coordinate systems in relations to a reference system. In this case, the measuring process can be effected against the same position establishing device with the various coordinate systems. An example of use is one in which two or more coordinate measuring machines are connected together to form a larger common measuring volume, or a number of milling machines which are intended to machine a large component together and at the same time.

The intrinsic system of the measuring machine or the like is used for displacing the positionable member, such as the measuring probe, to appropriate locations in order to obtain measured values or to establish suitable positions. In this respect a pre-programmed movement pattern can be obtained, therewith rendering the measuring process fully automatic. The density of the measuring points therebetween can also be readily adapted to the requirement dictated by the calculations. It has been found that in the case of spherical relationships where several spherical surfaces of different radius are used, it is suitable to use substantially the same measuring point density irrespective of the sphere radius.

It is also conceivable, and in many cases preferable, to divide the volume of the measuring machine or the like into smaller volume blocks and to determine the correction for each block, with each block being observed separately. This applies irrespective of the machine of the like to which the block belongs, in those instances when several machines or the like are used in unison.

The present invention should not therefore be considered to be restricted to the aforedescribed embodiments, since modifications can be made thereto within the scope of the invention defined in the claims.

We claim:

1. A method for determining and correcting positional errors which occur when measuring the position of a point in space or when positioning to a point which has a specific position in space, where said position refers to a specific coordinate system, such as a rectangular coordinate system, said method comprising comparing a multiple of measured values with at least one reference and determining a correction of positional errors on the basis of the comparison, and moving a positionable member to a given position in space during said measuring or defining process, characterized in that said reference is a geometry of known kind, and in that the correlation is used to calculate corrections for the coordinate axes (3, 6, 7) of the system, and wherein linear errors and non-linear errors are made the basis of said correction, where, for the purpose of determining corrections with respect to non-linear errors or deviations, several geometries are used, the differences between said different geometries being such as to enable detection of the influence of non-linear errors or deviations on the measured values.

2. A method according to claim 1, characterized in that said correction of positional errors is effected in respect of linear errors or deviations, such as angular errors or deviations between the different coordinate axes.

3. A method according to claim 1, characterized in that at least two different geometrics are used.

4. A method according to claim 1, characterized in that said geometry is that of a spherical surface.

5. A method according to claim 1, characterized in that said geometry is obtained with the aid of position establishing devices (8, 14, 15) against which measurements are determined and which are caused to adopt several positions.

6. A method according to claim 1, characterized in that calculated corrections are stored in a memory unit.

7. A method according to claim 1, characterized in that positional measurement values are corrected, preferably automatically, on the basis of calculated corrections.

8. A method according to claim 1, characterized in that when positioning to a given point in space, control signals are corrected, preferably automatically, on the basis of calculated corrections.

9. A method according to claim 1, characterized in that two or more separate coordinate systems intended for use as parts of a larger, common system are mutually adapted by using the same geometry for said different coordinate systems.

10. A method as defined in claim 1, wherein said positionable member is a contact probe.

11. A method as defined in claim 1, wherein said positionable member is a tool holder.

12. Apparatus for determining and correcting positional errors or deviations which occur when measuring the position of a point in space or when positioning to a point which has a specific position in space, where said position refers to a given coordinate system, such as a rectangular coordinate system, and which apparatus includes a positioning device and means for moving said positioning device to a given position in space during a measuring or positioning process, and also includes means for comparing a multiple of measured values with at least one reference and for determining corrections on the basis of said comparison, characterized in that position establishing devices (8, 14, 15) are provided for establishing positions disposed in accordance with a geometry of known kind, which constitutes said reference, and in that means are provided for calculating corrections for the coordinate axes (3, 6, 7) of the system with the aid of the correlation of said geometry to said measured values, and wherein said correction is based on linear errors or deviations and non-linear errors or deviations, wherewith corrections relating to non-linear errors or deviations are determined with the use of several geometries, the differences between said several geometries being such as to enable the influence of a non-linear error or deviation on said measured values to be detected.

13. Apparatus according to claim 12, characterized in that said correction of positional errors is intended to be based on linear errors or deviations, such as angular errors or deviations between the different coordinate axes (3, 6, 7).

14. Apparatus according to claim 12, characterized by position establishing devices (8, 14, 15) which are effective in engendering at least two mutually different geometries.

15. Apparatus according to claim 12, characterized in that said geometries correspond to a spherical surface.

16. Apparatus according to claim 12, characterized in that the position establishing devices (8, 14, 15) includes a measuring arm (9, 15) of which a first part is pivotally mounted on a journal which during a measuring process has a fixed position relative to a table (12), stand or corresponding structure, and of which a second part (11, 17) spaced from said first part, is intended to coact pivotally with a positionable member (1, 13) for establishing punctiform positions on one and the same spherical surface.

17. Apparatus according to claim 12, characterized by a memory unit for the storage of calculated corrections.

18. Apparatus according to claim 12, characterized by means for correcting positional measurement values, on the basis of calculated corrections.

19. Apparatus according to claim 12, characterized by means for correcting control signals, when positioning to a given point, said correction being effected on the basis of calculated corrections.

20. Apparatus according to claim 12, characterized in that two or more coordinate systems intended and arranged for use as constituents of a larger, common system, are intended to be adapted mutually by using the same geometry for all coordinate systems.

21. Apparatus according to claim 12, wherein said positioning device is a contact probe.

22. Apparatus according to claim 12, wherein said positioning device is a tool holder.

* * * * *